United States Patent [19]

Neff

[11] 4,257,572

[45] Mar. 24, 1981

[54] VALVE WITH INTERNAL ACCUMULATOR AND CHECK VALVE

[75] Inventor: James A. Neff, Bloomfield Township, Oakland County, Mich.

[73] Assignee: MAC Valves, Inc., Wixom, Mich.

[21] Appl. No.: 14,129

[22] Filed: Feb. 22, 1979

[51] Int. Cl.³ .................. F16K 31/124; F15B 13/043; F15B 20/00
[52] U.S. Cl. .................................. 251/30; 137/513.5; 137/625.64
[58] Field of Search ........................ 137/513.5, 625.64; 251/30

[56] References Cited

U.S. PATENT DOCUMENTS

| | | | |
|---|---|---|---|
| 3,038,500 | 6/1962 | Lansky | 137/596.16 X |
| 3,238,972 | 3/1966 | Bowman | 137/625.64 |
| 3,595,265 | 7/1971 | Cryder | 137/513.5 |

Primary Examiner—Gerald A. Michalsky
Attorney, Agent, or Firm—Robert G. Mentag

[57] ABSTRACT

A solenoid controlled, pilot operated valve which is provided with a pilot air accumulator chamber in the pilot air supply to insure soundness of operation of the pilot air supply, and make the shifting characteristics of the valve relatively constant and positive. The main spool valve is shifted in one direction by pilot air and shifted in the other direction by either a return spring alone, or a return spring with an air assist. The accumulator chamber may be supplied with pilot air from an external source of pressurized air, or from an internal source within the valve. If an internal source of pilot air is employed, then a check valve is operatively mounted in an air passage between the valve supply chamber and the accumulator chamber to allow free flow into the accumulator chamber and restrict any air bleeding back to the valve supply chamber.

8 Claims, 12 Drawing Figures

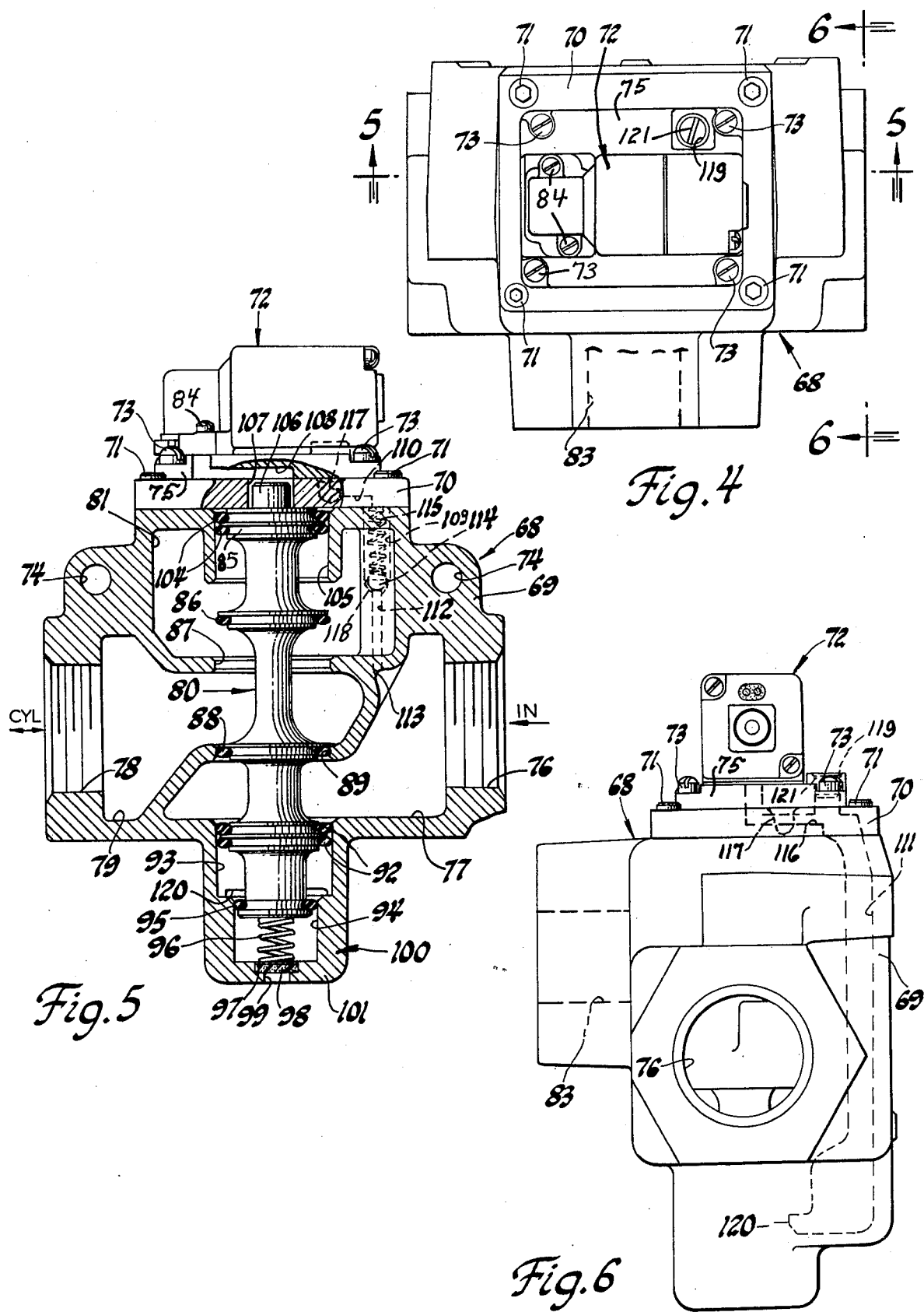

1

VALVE WITH INTERNAL ACCUMULATOR AND CHECK VALVE

BACKGROUND OF THE INVENTION

1. Field of the Invention

This invention relates generally to air valves, and more particularly, to solenoid controlled, pilot operated air valves, such as four-way valves, three-way valves, two-way valves and the like for use in controlling the flow of pressurized air to and from various apparatuses such as, a press clutch, an air brake, an air cylinder, or any other device requiring speedy control of large volumes of operating air.

2. Description of the Prior Art

It is known in the air valve art to provide solenoid controlled pilot operated valves such as four-way valves, three-way valves, two-way valves and the like. A problem encountered in such prior art valves is that the shifting characteristics of the valves are not constant, because of fluctuations in the pilot air supply when the pilot air is supplied from the main air supply for such a valve. An example of a prior art valve employing an accumulator in the pilot air supply is shown in U.S. Pat. No. 3,238,972. A disadvantage of the accumulator system disclosed in said U.S. Pat. No. 3,238,972 is that the restricted orifice in the internal supply passage does not permit a fast flow of a full supply or volume of air into the accumulator system when a demand for a large volume of air is made on the accumulator. Another example of the use of an accumulator in a valve control system is illustrated in U.S. Pat. No. 3,119,308. The use of an accumulator in a time delay valve is also shown in U.S. Pat. No. 3,256,906.

SUMMARY OF THE INVENTION

In accordance with the invention, a flow control air valve is provided with a pilot air accumulator chamber, in the valve body, which is connected to a solenoid operated pilot valve that operates the main valve spool of the air valve in one direction against the pressure of a return spring. The accumulator chamber is connectible to either an internal or an external source of pilot air under pressure. The internal source of pilot air may be the main operating air chamber of the air valve, and in such an operation a check valve means is operatively mounted between the pilot air internal source and the accumulator chamber to provide a full supply of pressurized pilot air under optimum pressure conditions in the main air supply of the valve, and to prevent any quick bleed back of the air in the accumulator if a pressure drop occurs in the main air supply of the valve. The check valve means may be either a spring biased ball check valve or a poppet type check valve. The accumulator chamber may also be connected to an air assist return chamber in operative relationship with the main valve spool to create an air differential which assists the return action of the return spring.

BRIEF DESCRIPTION OF THE DRAWINGS

FIG. 4 is a top plan view of another three-way, in-line valve structure with an accumulator means made in accordance with the principles of the present invention.

FIG. 5 is an elevation view, partly in section, of the valve structure illustrated in FIG. 4, taken along the line 5—5 thereof, and looking in the direction of the arrows.

FIG. 6 is a right side elevation view of the valve structure illustrated in FIG. 4, taken along the line 6—6 thereof, and looking in the direction of the arrows.

DESCRIPTION OF THE PREFERRED EMBODIMENTS

Figure 1:
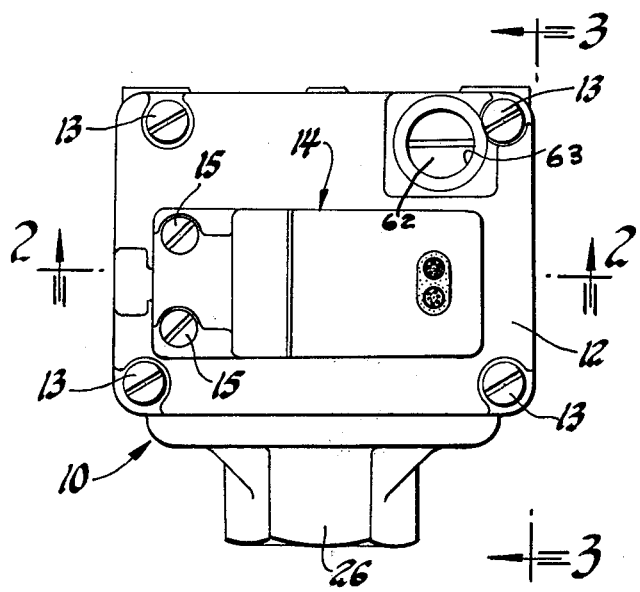
FIG. 1 is a top plan view of a three-way, in-line valve provided with an accumulator means made in accordance with the principles of the present invention.
Figure 2:
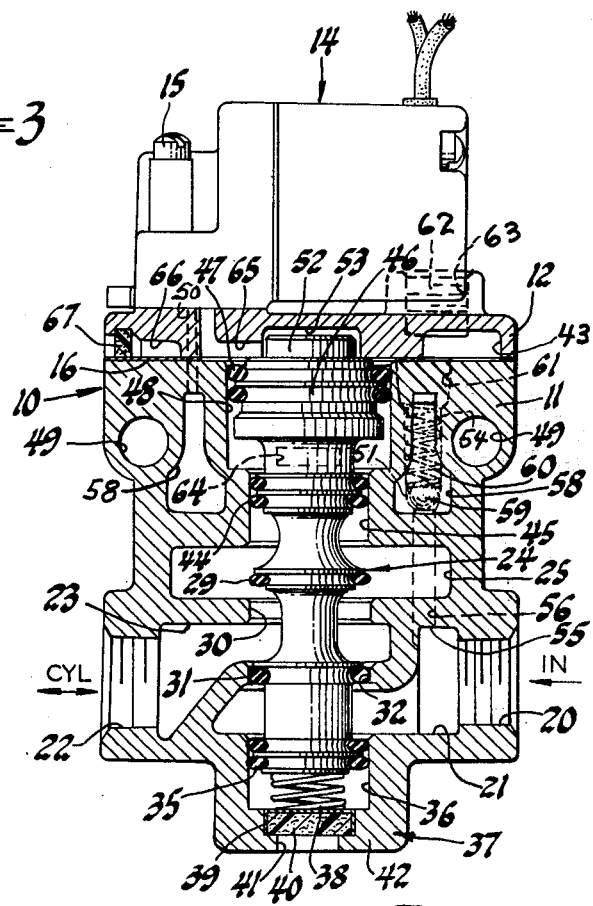
FIG. 2 is an elevation view, partly in section, of the valve structure illustrated in FIG. 1, taken along line 2—2 thereof, and looking in the direction of the arrows.
Figure 3:
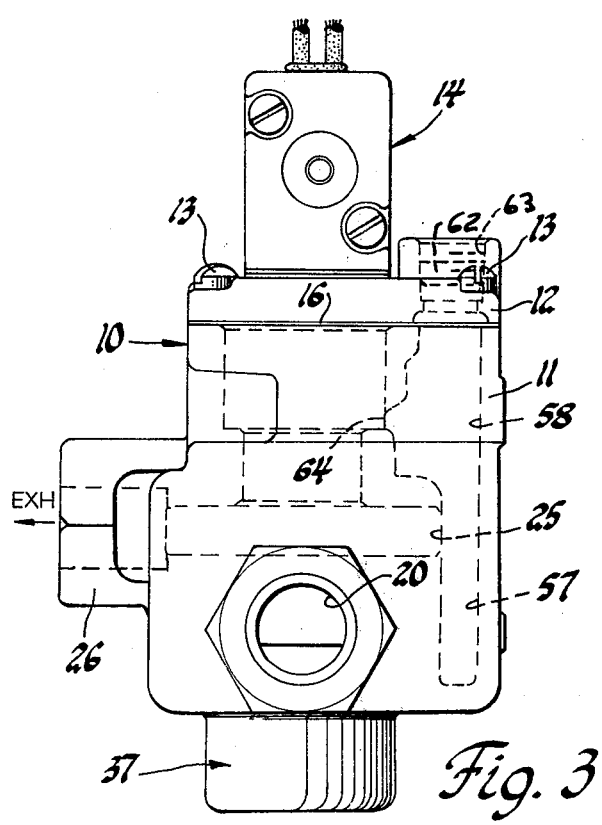
FIG. 3 is a right side elevation view of the valve structure illustrated in FIG. 1, taken along the line 3—3 thereof, and looking in the direction of the arrows.

Referring now to the drawings, and in particular to FIGS. 2 and 3, the numeral 10 generally indicates a pilot operated, three-way in-line valve made in accordance with the principles of the present invention. The numeral 11 indicates the valve body which is enclosed at its upper end by a suitable adaptor cover plate 12 that is secured to the body 11 by suitable machine screws 13. The numeral 14 generally indicates a conventional three-way pilot valve assembly which is solenoid controlled, and which is attached to the adaptor cover plate 12 by any suitable means, as by machine screws 15 (FIG. 1). As shown in FIGS. 2 and 3, a suitable gasket 16 is mounted between the cover plate 12 and the valve body 11. The valve body 11 is provided with an inlet or supply port 20 which communicates with an inlet or supply chamber 21. A cylinder port or work port 22 is formed in the valve body 11, in a position diametrically opposite to the supply port 20, and it communicates with a cylinder chamber 23.

As shown in FIG. 2, a master spool valve is generally indicated by the numeral 24. The spool valve 24 is operatively mounted in the valve body 11 for controlling the flow of air from the supply chamber 21 to the cylinder chamber 23, and the exhausting of air from the cylinder chamber 23 to an exhaust chamber 25. As shown in FIG. 3, an exhaust port 26 is formed in the valve body for communication with the exhaust chamber 25.

The valve spool 24 is provided with an annular valve seal member 29 which is intermediately disposed, in a position shown in FIG. 2, to allow flow between the cylinder chamber 23 and the exhaust chamber 25. The valve spool 24 is movable downwardly, as described hereinafter, so that the valve seal member 29 engages the walls of the circular passageway 30 formed through a dividing wall between the cylinder chamber 23 and the exhaust chamber 25 for blocking the flow between the last two mentioned chambers. As shown in FIG. 2, the valve spool 24 is also provided with a second valve seal member 31 which is longitudinally spaced apart from the valve seal member 29 and which is normally disposed in a sealing position in a circular passageway 32 formed through a dividing wall between the supply chamber 21 and the cylinder chamber 23 to block flow between the last two mentioned chambers.

The lower end of the valve spool 24 is provided with a pair of annular seal members 35 that sealingly engage the surface of a bore or chamber 36 in an axial boss 37 which is integrally formed on the lower end of the valve body 11. A return spring 38 is operatively mounted in the chamber 36, with its upper or inner end abutting the lower end of the valve spool 24, and its lower or outer end abutting a filter cup which is seated over a suitable filter 40. The filter 40 is mounted over an opening 41 which is formed in the lower wall 42 of the boss 37 for communicating the chamber 36 with the atmosphere. The filter cup is designated by the numeral 39, and it covers the inner face and circular side of the annular filter 40.

The valve spool 24 is provided with a pair of annular seal members 44 in a position spaced longitudinally upward from the seal member 29. The seal members 44 are slidably and sealingly mounted in an axial bore 45 in the valve body 11. The bore 45 communicates with the exhaust chamber 25. The bores 30, 32, 36 and 45 are identical in diametrical size.

The upper end of the valve spool 24 is enlarged to provide an integral pilot piston 46 which has a pair of seal members 47 operatively mounted around the periphery thereof. The seal members sealingly engage the surface of the annular chamber or cylinder 48 which communicates at its inner end with the bore 45. The numeral 49 in FIG. 2 designates mounting holes for mounting the valve 10 in a desired operating position.

As shown in FIG. 2, the upper end of the valve spool 24 is provided with an integral, reduced diameter annular extension 52 which extends into an annular chamber 53 formed in the inner face of the cover plate 12. The chamber 53 communicates with the pilot valve 14 through a passageway 65 for admitting pressurized pilot air into the chamber 53 for moving the valve spool 24 downwardly against the pressure of the return spring 38 to move the valve spool 24 to a position to open the passageway 32 between the supply chamber 21 and the cylinder chamber 23, and close off the passage 30 from the cylinder chamber 23 to the exhaust chamber 25. The cover plate 12 is also provided with a pilot valve exhaust passageway 66 in which is operatively mounted a filter 67 for exhausting air from the chamber 53 and through the pilot valve 14 when the pilot valve 14 is deenergized. The pilot valve 14 is a conventional pilot valve, and the parts thereof are not shown since they do not form any part of the present invention and any suitable pilot valve 14 may be used.

When the pilot valve 14 is de-energized, the return spring 38 moves the valve spool 24 upwardly to the normal position shown in FIG. 2. However, the shifting of the valve spool 24 to the normal position shown in FIG. 2 is assisted by a supply of pressurized pilot air directed into the air assist chamber 48 for exerting an upward differential pressure on the enlarged pilot end 46 of the valve spool 24.

As shown in FIG. 2, a port 55 connects the supply chamber 21 with a passage 56 that leads to a check valve chamber 54. The upper end of the check valve chamber 54 communicates with a threaded plug bore 61, in the upper end of the valve body 11, which communicates through the adaptor cover plate 12 with an accumulator chamber 58 that is arcuately formed around air assist chamber 48. The lower end of the accumulator chamber 58 is indicated by the numeral 57 in FIG. 3. A ball check valve 59 is operatively mounted in the lower end of the check valve chamber 54 on a seat which is formed at the upper end of the passage 56. A spring 60 biases the ball check valve 59 to a closed position on its seat when the pressurized air supplied to the supply port 20 is turned off, or there is a pressure drop or fluctuation in the system supplying the port 20 with pressurized air, or fluctuations caused internally in the valve, or fluctuations downstream of the valve, between the valve and the apparatus to which the valve is connected. A pair of bleed slots 51 are formed on diametrically opposite sides of the ball check valve seat to allow air in the accumulator chamber 58 to bleed off slowly out of the accumulator system and into the supply chamber 21 when the air supply to the inlet port 20 is shut off, or there is a pressure drop in the air supply system to the inlet port 20.

The accumulator chamber 58 is connected by any suitable passage, as by a passage 50, shown in FIG. 2, to the pilot valve 14 for also supplying pressurized air to the pilot valve 14. As shown in FIGS. 1, 2 and 3, the upper end of the threaded plug bore 61 communicates with a passage 43 in the adapter cover plate 12 which in turn communicates with an external threaded port 63. When the valve 10 is supplied with pilot air internally, through the passage 56, the external threaded port 63 is enclosed by a threaded pipe plug 62, as shown in FIGS. 1, 2 and 3. If it is desired to supply the accumulator chamber 58 and the pilot valve 14 from an external pilot air source, the plug 62 is removed and the external pilot air is supplied to the accumulator chamber 58 through the threaded port 63 (FIG. 3). Also, the internal pilot air supply is blocked off by mounting a suitable pipe plug in the threaded plug bore 61 at the upper end of the internal passage 54.

It will be understood, that the accumulator chamber 58 is made to a size large enough to hold enough air to provide a number of operations of the pilot valve 14 in case of changes in the air supply to the supply chamber 21, as for example, a sudden drop of pressure in the pressurized air supply system. The accumulator system provides for positive operation of the valve spool 24, and in case of a sudden drop of pressure in the air supply, the ball check valve 59 closes and restricts the air bleeding back into the main supply chamber 21, as a safety feature. There would then be a sufficient volume of pressurized air stored in the accumulator chamber 58 to shift the valve spool 24 several times before the valve would be inoperative. The bleed slots 51 (FIG. 2) would permit the air in the accumulator chamber 58 to bleed off slowly. However, the use of the ball check valve 59 provides a large opening or passageway into the accumulator chamber 58 so that the ball check valve 59 will open and allow a large volume of air to enter the accumulator chamber 58 when a demand for a lot of air is made on the accumulator chamber 58, as when the valve is operating at a high speed.

FIGS. 4, 5 and 6 illustrate a second embodiment of a three-way pilot operated flow control air valve, generally indicated by the numeral 68, which is provided with an accumulator chamber 111 in the pilot air system. The numeral 69 indicates the valve body which is enclosed at its upper end by a suitable cover plate 70 that is secured to the body 69 by suitable machine screws 71. The numeral 72 generally indicates a conventional three-way pilot valve assembly which is solenoid controlled, and which is attached to an adaptor plate 75 by suitable machine screws 84. The adaptor plate 75 is secured to the cover plate 70 by suitable machine screws 73. The numeral 74 in FIG. 5 designates mounting holes for mounting the valve 68 in a desired operating position.

As shown in FIG. 5, the valve body 69 is provided with an inlet or supply port 76 which communicates with an inlet or supply chamber 77. A cylinder port or work port 78 is formed in the valve body 69, in a position diametrically opposite to the supply port 76, and it communicates with a cylinder chamber 79.

As shown in FIG. 5, a master spool valve is generally indicated by the numeral 80. The spool valve 80 is operatively mounted in the valve body 69 for controlling the flow of air from the supply chamber 77 to the cylinder chamber 79, and the exhausting of air from the cylinder chamber 79 to an exhaust chamber 81. As shown in FIGS. 4 and 6, an exhaust port 83 is formed in the valve body 69 for communication with the exhaust chamber 81.

The valve spool 80 is provided with an annular valve seal member 86 which is intermediately disposed, in a position shown in FIG. 5, to allow flow between the cylinder chamber 79 and the exhaust chamber 81. The valve spool 80 is movable downwardly, as described hereinafter, so that the level seal member 86 engages the walls of the circular passageway 87 formed through a dividing wall between the cylinder chamber 79 and the exhaust chamber 81 for blocking flow of air between the last two mentioned chambers. As shown in FIG. 5, the valve spool 80 is also provided with a second valve seal member 88 which is longitudinally spaced apart from the valve seal member 86 and which is normally disposed in a sealing position in a circular passageway 89 formed through a dividing wall between the supply chamber 77 and the cylinder chamber 79 to block flow of air between the last two mentioned chambers.

The lower end of the valve spool 80 is provided with a pair of annular seal members 92 that sealingly engage the surface of a bore or chamber 93 in an axial boss 100 which is integrally formed on the lower end of the valve body 69. The valve spool 80 has a reduced diameter lower end on which is mounted a seal member 95 that slidingly engages a chamber 94 that communicates with the chamber 93. A return spring 96 is operatively mounted in the chamber 94, with its upper or inner end abutting the lower end of the valve spool 80, and its lower or outer end abutting a filter cup 97 which is seated over a suitable filter 98. The filter 98 is mounted over an opening 99 which is formed in the lower wall 101 of the boss 100 for communicating the chamber 94 with the atmosphere.

The valve spool 80 is provided on its upper end with an integral pilot piston 85 that carries a pair of annular seal members 104 in a position spaced longitudinally upward from the seal member 86. The seal members 104 are slidably and sealingly mounted in an axial pilot piston bore 105 in a hub that is extended inwardly from the upper end of the valve body 69 into the exhaust chamber 81. The bore 105 communicates with the exhaust chamber 81. The bores 93, 87, 89 and 105 are identical in diametrical size.

As shown in FIG. 5, the upper end of the valve spool 80 is provided with an integral, reduced diameter annular extension 106 which extends into an annular chamber 107 formed through the cover plate 70. The chamber 107 communicates with the pilot valve 72 through a passageway 108 for admitting pressurized pilot air into the chamber 107 for moving the valve spool 80 downwardly against the pressure of the return spring 96 to move the valve spool 80 to a position to open the passageway 89 between the supply chamber 77 and the cylinder chamber 79, and close off the passageway 87 from the cylinder chamber 79 to the exhaust chamber 81. The pilot valve 72 is a conventional pilot valve, and the parts thereof are not shown since they do not form any part of the present invention and any suitable pilot valve 72 may be used.

As shown in FIG. 5, a port 113 connects the supply chamber 77 with a passageway 112 that leads to a check valve chamber 109. The check valve chamber 109 communicates at its upper end with a passageway 110 in the cover plate 70. The passageway 110 is connected to a threaded pipe plug bore 117 which communicates with passageway 116. The passageway 116 communicates with the upper end of the accumulator chamber 111 and with the pilot valve 72 for supplying pressurized air to the pilot valve 72. As shown in FIG. 6, the passageway 116 is also connected to an external, threaded port 119, which is enclosed by a threaded pipe plug 121 when the accumulator chamber 111 is supplied with internal pressurized pilot air through the port 113 and the passageway 112 from the supply chamber 77. If it is desired to supply the accumulator chamber 111 and the pilot valve 72 with pressurized pilot air from an external source, the pipe plug 121 is removed and the external pilot air is supplied to the accumulator chamber 111 through the threaded port 119. When the pipe plug 121 is removed for attachment of the port 119 to the external source of pilot air, a suitable pipe plug is inserted in the threaded pipe plug bore 117 to block the flow of internal pilot air from the port 113 and the passageway 112.

The lower end of the accumulator chamber 111 is connected by a passageway 120 to the chamber 93 (FIGS. 5 and 6). A ball check valve 114 (FIG. 5) is operatively mounted in the lower end of the check valve chamber 109 on a seat which is formed in the valve body 69 at the upper end of the passage 112. A spring 115 is operatively mounted in the check valve chamber 109 and it biases the ball check valve 114 to a closed position on its seat. A pair of bleed slots 118 are formed on diametrically opposite sides of the seat in the valve body 69, to allow air in the accumulator chamber 111 to bleed off slowly out of the accumulator system and into the supply chamber 77 when the air supply to the inlet port 76 is shut off. When the pilot valve 72 is de-energized, the return spring 96 moves the valve spool 80 upwardly to the normally closed position shown in FIG. 5, and the spring 96 is assisted by the pressurized pilot air in the air return chamber 93.

It will be understood that the accumulator chamber 111 is made to a size large enough to hold enough air to provide a number of operations of the pilot valve 72 in the same manner and under the same conditions as described for the first embodiment of FIGS. 1, 2 and 3.

Figure 7:
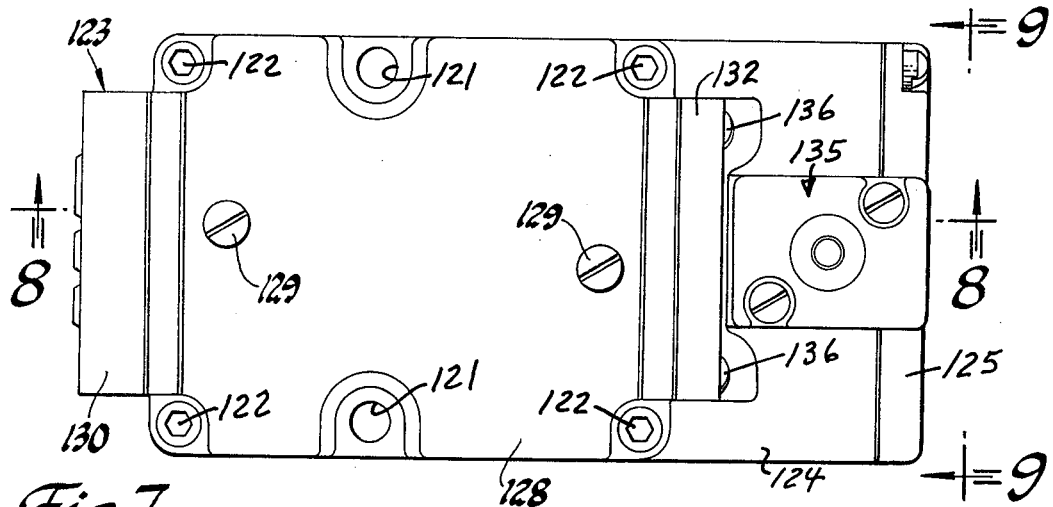
FIG. 7 is a top plan view of a four-way valve provided with an accumulator means made in accordance with the principles of the present invention.
Figure 8:
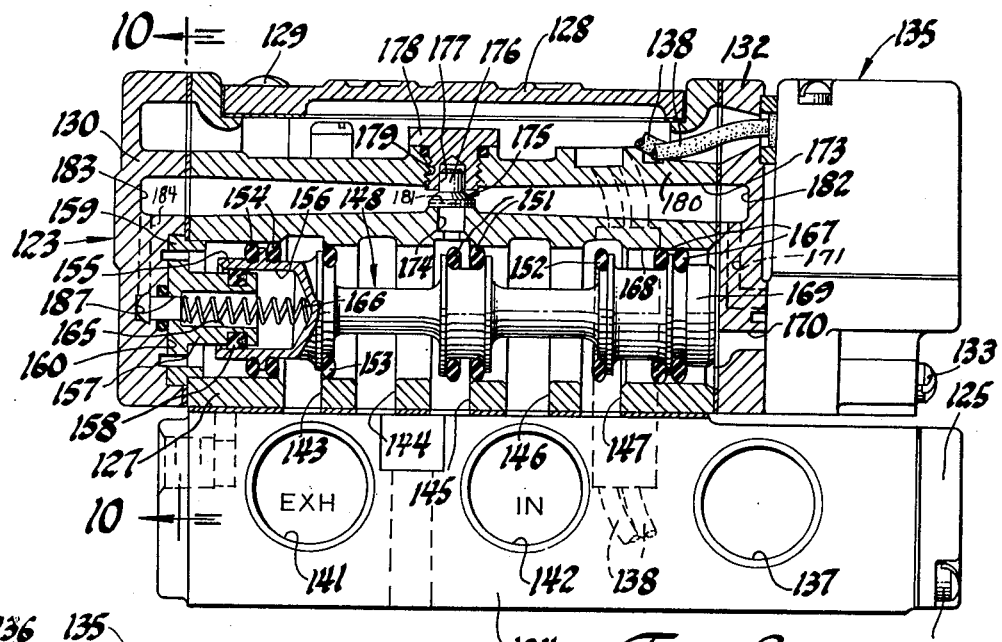
FIG. 8 is an elevation view, partly in section, of the structure illustrated in FIG. 7, taken along line 8—8 thereof, and looking in the direction of the arrows.
Figure 9:
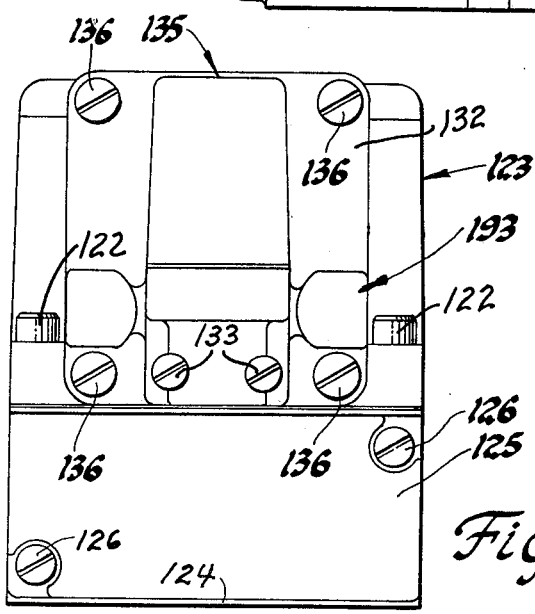
FIG. 9 is a right side elevation view of the valve structure illustrated in FIG. 7, taken along line 9—9 thereof, and looking in the direction of the arrows.

FIGS. 7 through 12 illustrate a third embodiment of a four-way, two position valve, generally indicated by the numeral 123, which is operated by a solenoid controlled pilot valve 135, and which is provided with an accumulator chamber 173 in the pilot air system. The valve 123 includes a standard base member 124 which has one open end that is enclosed by a detachable cover plate 125. The cover plate 125 is secured to the base member 124 by suitable machine screws 126 (FIGS. 8 and 9). A valve body 127 is secured to the base member 124 by suitable machine screws 122 (FIG. 7). As shown in FIG. 7, the valve 123 is provided with mounting holes 121 for mounting the valve 123 in a desired location.

Figure 10:
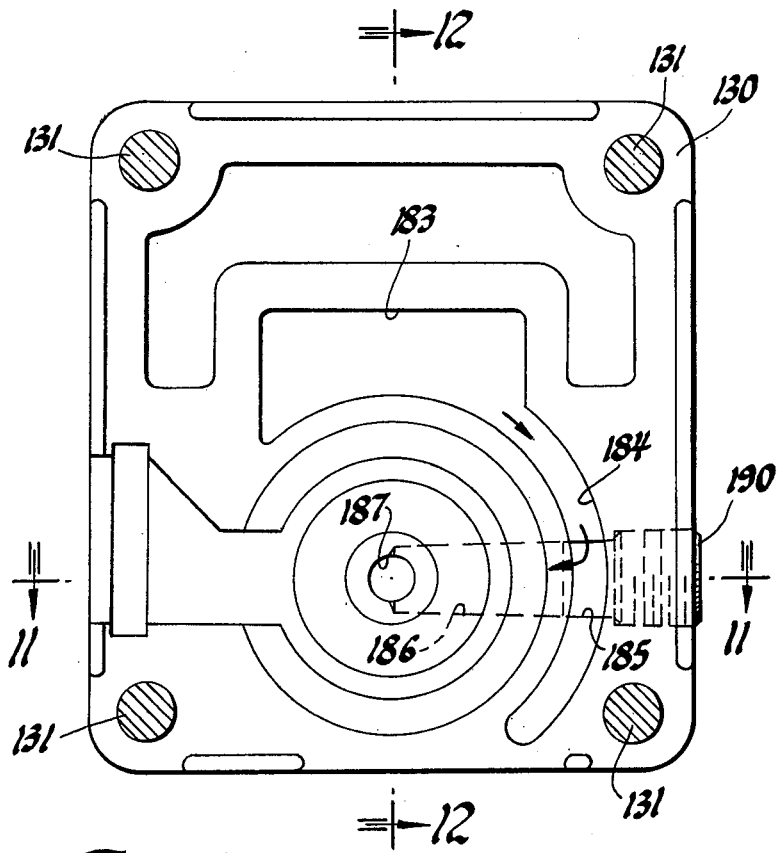
FIG. 10 is an elevation section view of the valve structure illustrated in FIG. 8, taken along line 10—10 thereof, and looking in the direction of the arrows.
Figure 11:
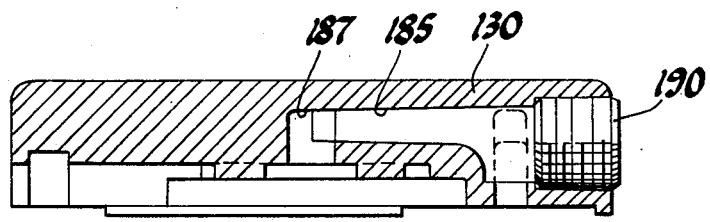
FIG. 11 is a horizontal section view of the valve structure illustrated in FIG. 10, taken along the line 11—11 thereof, and looking in the direction of the arrows.
Figure 12:
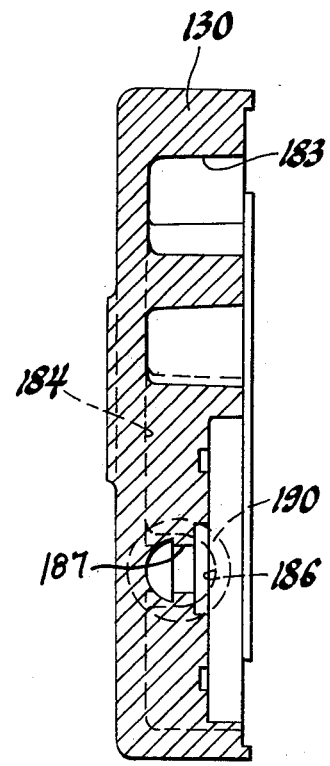
FIG. 12 is a vertical section view of the valve structure illustrated in FIG. 10, taken along the line 12—12 thereof, and looking in the direction of the arrows.

As shown in FIGS. 7 and 8, the valve body 127 is enclosed on its upper end by a top end cover plate 128 which is secured in place by suitable machine screws 129. As viewed in FIG. 8, the left end of the valve body 127 is enclosed by an end cover plate 130 which is secured in place by suitable machine screws 131 (FIG. 10). The right end of the valve body 127 is enclosed by an adaptor cover plate 132 which is secured in place by suitable machine screws 136. A conventional solenoid controlled pilot valve, generally indicated by the numeral 135, is operatively mounted on the adaptor cover plate 132 by suitable machine screws 133 (FIG. 9). As shown in FIG. 8, the lead wires 138 for the solenoid controlled pilot valve 135 are adapted to be connected to a suitable source of electrical power through the port 137.

As shown in FIG. 8, the base 124 is provided with an inlet or supply port 142 for connection to a suitable source of pressurized air. The numeral 141 indicates an exhaust port. The inlet port 142 is connected by suitable passageways in the base member 124 to the supply chamber 145. The exhaust port 141 is connected by suitable passageways in the base member 124 to the two exhaust chambers 143 and 147. The two cylinder chambers 144 and 146 are connected by suitable passageways in the base member 124 to two ports on the opposite side of the base member 124.

The numeral 148 in FIG. 8 generally designates a valve spool which is operatively mounted in a valve bore 168 that extends longitudinally through the valve body 127. The valve spool 148 is provided with the usual spaced apart annular seal members 151, 152, 153, 154 and 167 for controlling the flow of fluid between the inlet port 142, the exhaust port 141 and the cylinder ports.

As viewed in FIG. 8, the valve spool 148 is normally biased to the right to the position shown by a return spring 166. The left end 155 of the valve spool 148 is provided with a piston cylinder 156 in which is slidably mounted on a fixed, axial shaft 157 that is carried on an integral flange 159 which is seated in a recess 160 formed in the inner face of the end cover 130. The piston 157 is provided with a suitable annular seal 158.

As shown in FIG. 8, the inner end of the return spring 166 is seated on the inner end wall of the piston cylinder 156, and the outer end of the return spring 166 is seated in an axial bore 165 in the fixed piston 157 and against the end wall of the bore 165.

As shown in FIG. 8, an accumulator chamber 173 is formed in the upper end of the valve body 127, and it is supplied with pressurized pilot air from the supply chamber 145 through a passageway 174. The pilot valve 135 is provided with pilot air from the accumulator chamber 173 through suitable passageways 182 and 171 in the adaptor cover plate 132. The valve spool 148 is moved to the left to change the flow through the valve 123 when the pilot valve 135 is energized to admit pilot air through the passageway 170 against the pilot head end 169 of the valve spool 148.

If the air pressure in the supply chamber 145 should drop momentarily, the accumulator chamber 173 would still supply the pilot valve 135 for a few cycles of the valve because the passageway 174 would be blocked by the action of the poppet type check valve 175. The check valve 175 has a cylindrical shaft 176 which is slidably mounted in a bore 177 in a threaded plug 178 which is threadably mounted in a threaded bore 179 formed in the valve body wall 180. When the air pressure in the air supply chamber 145 momentarily goes down or fluctuates, the air pressure in the accumulator chamber 173 acts on the upper end of the circular head of the poppet check valve 175 to move it to the closed position shown in FIG. 8. When the air pressure is normal in the supply chamber 145, the check valve 175 is lifted off the seat at the upper end of the passageway 174 to admit air into the accumulator chamber 173. The poppet check valve 175 is provided on its lower flat face with a transverse slot 181 to slowly bleed off the pressure in the accumulator chamber 173 when the pressurized air to valve 123 is shut off.

The accumulator chamber 173 also supplies pressurized pilot air to the return spring cylinder 156 to assist the return spring 166. As shown in FIGS. 8, 10, 11 and 12, the accumulator chamber 173 communicates with a chamber 183 in the cover 130 which is connected by the passageways 184, 185, 186 and 187 with the spring bore 165 and the piston cylinder 156. The numeral 190 designates a threaded plug at the end of the passageway 185. If desired, the accumulator chamber 173 could be supplied with external pilot air through the opening in which the plug 190 is mounted or through some other suitable passageway. The numeral 193 in FIG. 9 designates the exhaust port for the pilot valve 135.

While it will be apparent that the preferred embodiments of the invention herein disclosed are well calculated to achieve the results aforestated, it will be appreciated that the invention is susceptible to modification, variation and change.

What is claimed is:

1. A pilot air operated air valve including a valve body with a pressurized air supply chamber and having an axially movable valve spool operatively mounted therein which is moved in one direction by a return spring and in the other direction by pressurized pilot air controlled by a pilot valve, characterized in that:
    (a) an accumulator chamber is formed in the valve body and it is connected by passageway means to a supply source of pilot air and to the pilot valve for supplying pilot air to the pilot valve; and,
    (b) the accumulator chamber is connected by passageway means, which is not connected to the air supply chamber, to an air return chamber communicating with the valve spool for admitting pilot air from the accumulator chamber to the air return chamber to assist the return spring in its valve spool return action.

2. A pilot air operated air valve as defined in claim 1, characterized in that:
    (a) a check valve means is operatively mounted in the passageway means between the pilot air supply source and the accumulator chamber, and it is movable to a closed position when the pressure in the pilot air supply source is reduced.

3. A pilot air operated air valve as defined in claim 2, characterized in that:

(a) the return spring is mounted in the air return chamber.

4. A pilot air operated air valve as defined in claim 2, characterized in that:
 (a) the check valve means comprises a spring biased ball check valve.

5. A pilot air operated air valve as defined in claim 4, characterized in that:
 (a) a valve seat is formed in the passageway means between the supply source and the accumulator chamber, and said ball check valve is engageable with said valve seat when the pressure in the pilot air supply is reduced; and,
 (b) said valve seat is provided with at least one bleed slot to allow the pressurized air in the accumulator chamber to bleed off slowly when said ball check valve is engaged with said valve seat.

6. A pilot air operated air valve as defined in either of claims 2 or 3, characterized in that:
 (a) the check valve means comprises a poppet check valve.

7. A pilot air operated air valve as defined in claim 6, characterized in that:
 (a) a valve seat is formed in the passageway means between the supply source and the accumulator chamber, and said poppet check valve is engageable with said valve seat when the pressure in the pilot air supply is reduced;
 (b) said poppet check valve is provided with at least one bleed slot communicating through the valve seat with said last named passageway means to allow the pressurized air in the accumulator chamber to bleed off slowly when said poppet check valve is engaged with said valve seat.

8. A pilot air operated air valve as defined in either of claims 2 or 3, characterized in that:
 (a) the air supply chamber in the valve body comprises the supply source of pilot air for the accumulator chamber.

* * * * *